UNITED STATES PATENT OFFICE.

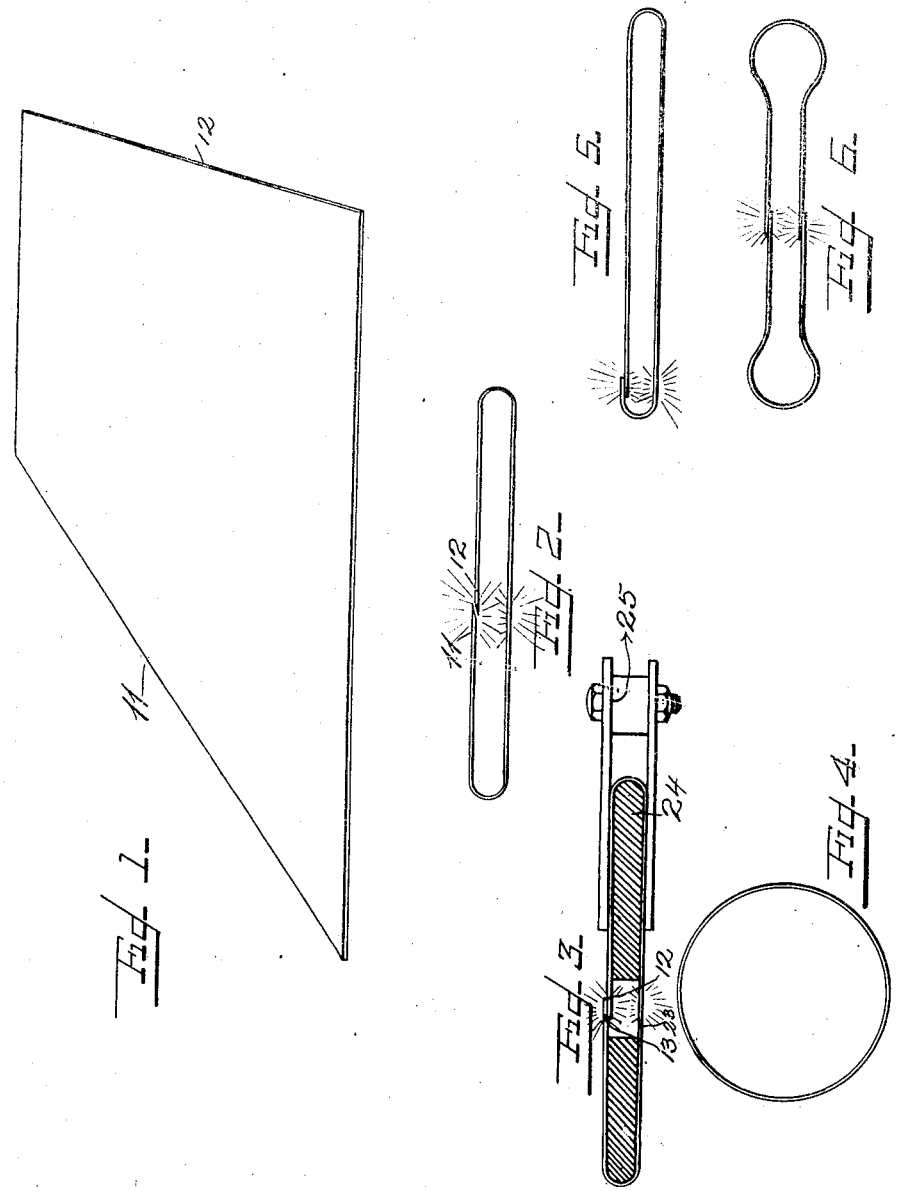

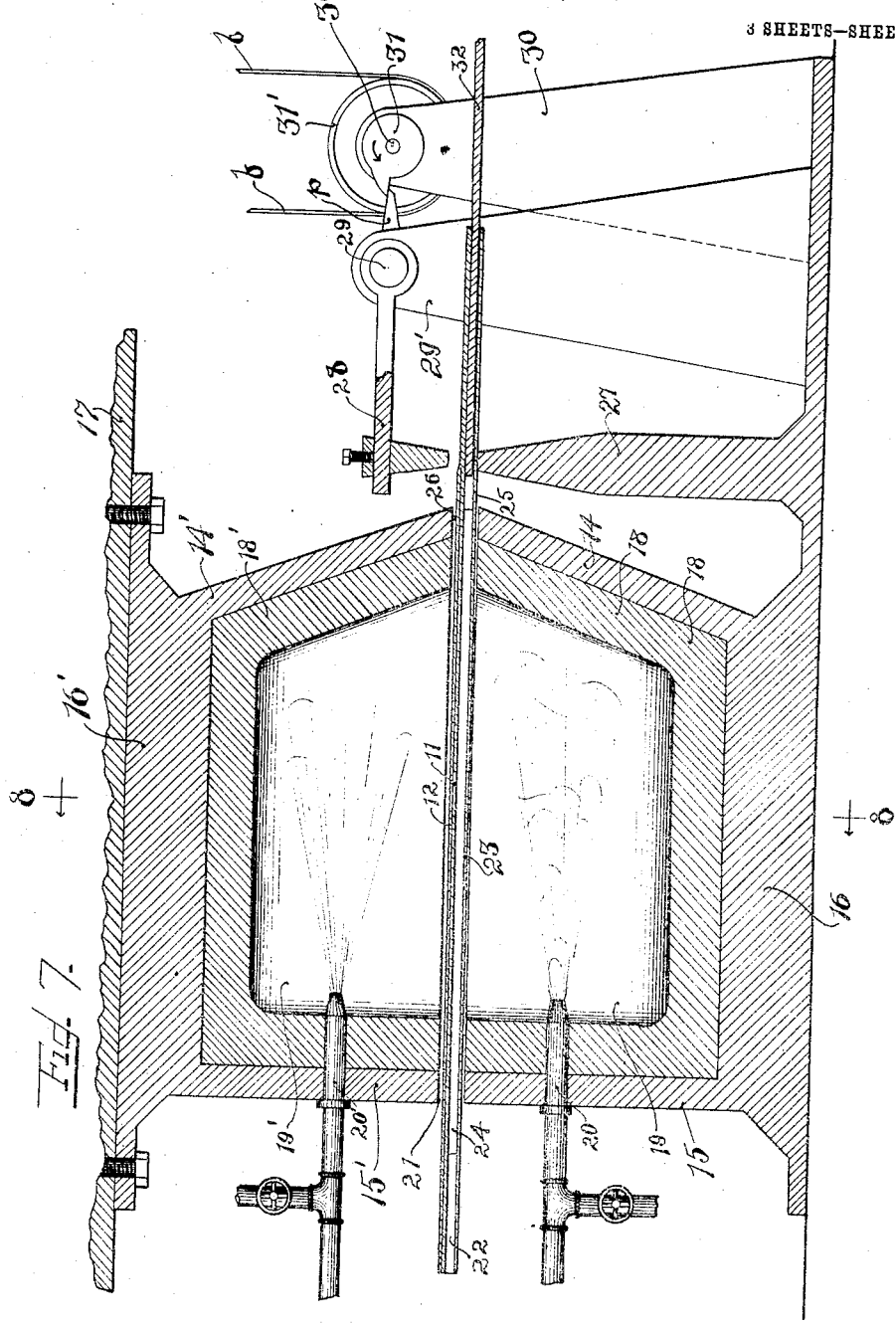

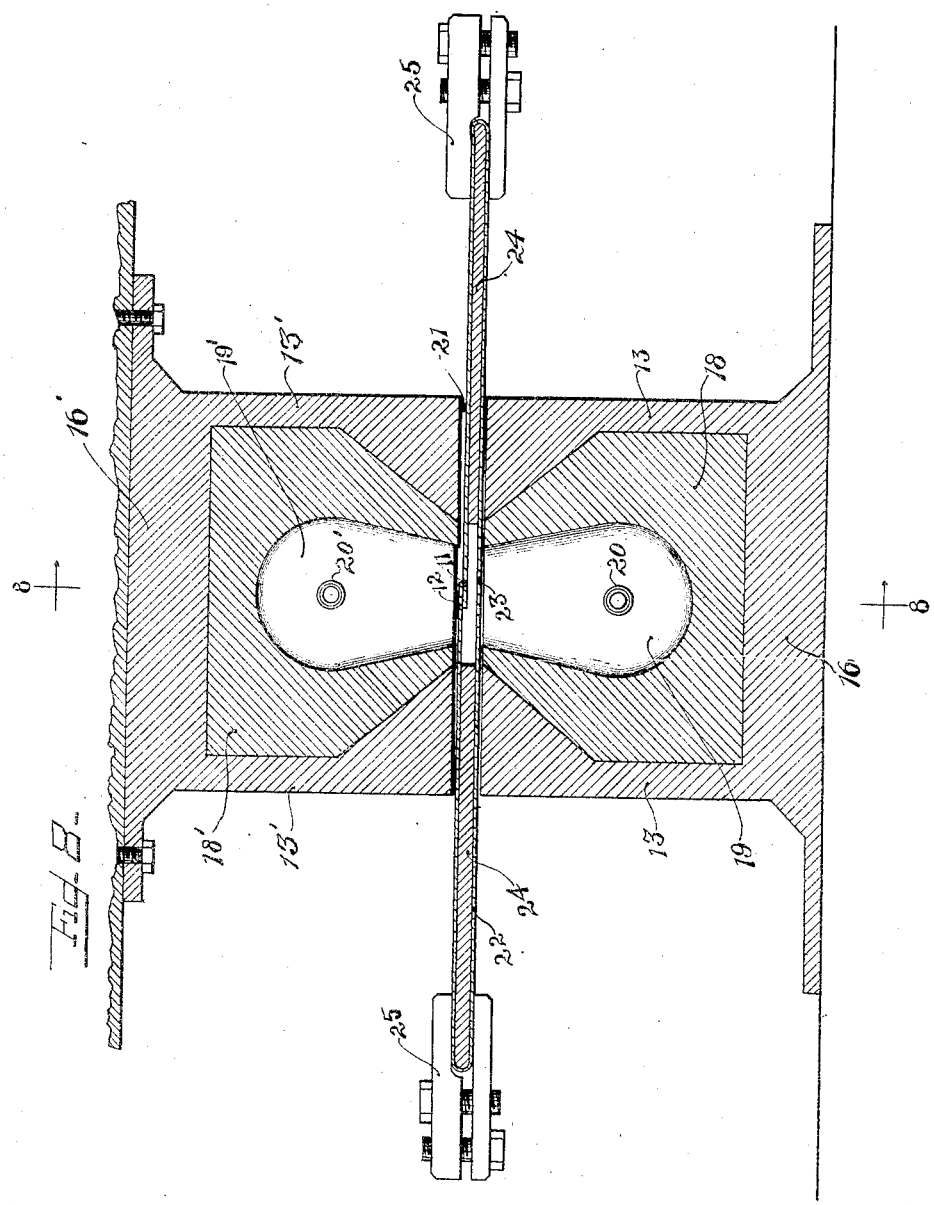

JAMES HALL TAYLOR, OF CHICAGO, ILLINOIS.

PIPE-WELDING PROCESS.

No. 837,976.    Specification of Letters Patent.    Patented Dec. 11, 1906.

Application filed March 5, 1904. Serial No. 196,681.

*To all whom it may concern:*

Be it known that I, JAMES HALL TAYLOR, a citizen of the United States, residing at Chicago, in the county of Cook and State of Illinois, have invented a certain new and useful Improvement in Pipe-Welding Processes, (Case 8,) of which the following is a full, clear, concise, and exact description, reference being had to the accompanying drawings, forming a part of this specification.

My invention relates to an improved process for making pipe or tubing.

While my invention may be employed in forming an endless variety of tubing, it is particularly well adapted for use in making tubing of very thin sheet metal, and the tubing thus formed may, if desired, be of relatively large diameter. For instance, my invention may be employed in forming pipe anywhere from two or three inches in diameter to forty or fifty inches in diameter, and the sheet-metal employed for this purpose may be of only one-sixteenth of an inch or less in thickness. Tubing formed in this way may be used for conveying gases or fluids under relatively low pressure.

My invention relates particularly to a process for forming tubing in which the two edges of a lap or butt joint are welded together. One process which has been used in forming such welded tubing consists in heating only those portions of the metal of the tube adjacent to the edges which are to be welded together, the remainder of the shell of the tube being mantained at a relatively low temperature. In accordance with this process the sheet metal of which the tube is to be formed is first shaped so as to bring the edges which are to be welded into proper welding position. The joint is then heated by suitable means and the two edges welded together. It has heretofore been impossible or at least impracticable to in this way bring the edges to a proper welding heat and to maintain them at this welding temperature during the welding process, particularly if the sheet metal of which the tube is to be formed is comparatively thin, and especially when tubes are made of the smaller diameters, where it is impossible to use a furnace on the interior of the pipe. While it may have been possible to maintain the outer lap of a lapped joint at the proper temperature, the inner lap has been so far cooled as to prevent the proper welding of the joints.

Another method which has been employed in making welded tubing has been to form a suitable sheet-metal blank into a tube of circular or other cross-section. The whole tube has then been heated and the joint brought to a welding temperature; but in this process the entire walls of the tube must necessarily be brought to so high a temperature that they become exceedingly flexible, and it is impossible to make them retain their shape until the welding has been accomplished. In forming pipe of large diameter and very thin metal it is absolutely impossible to make the tubing retain its shape during the welding process by the above-mentioned method of the prior art.

Another method which has heretofore been employed in forming welded pipe has been that of providing a furnace not only upon the outside of a pipe of circular cross-section, but also upon the interior. These two furnaces heat the joint which is to be welded. This method introduces serious difficulties—first, for the reason that it is important to have an even and uniform width of lap throughout the length of pipe to be welded, and it is extremely difficult to form and maintain such a uniform lap-joint on a tube of circular cross-section. The maintenance of a uniform lap-joint of this character is interfered with by the tendency of the metal to creep and strain under the influence of the heat and the welding-hammers. It has been attempted to overcome the difficulties connected with the last-mentioned process by heating the entire tube to a temperature somewhat less then the welding heat of the lapped joint; but, as I have before mentioned, the heating of all the metal of a tube formed of thin material causes it to collapse and warp out of shape.

It is the primary object of my invention to provide a process for forming tubing in which the joint or seam may be maintained at a welding temperature for a sufficient length of time to permit the welding operation and at the same time to provide means for retaining the larger portion of the shell at a low temperature, whereby its shape may be retained during the welding process.

The objects of my invention are accomplished by my improved process, which may be described as follows: A sheet of iron, steel, or other suitable metal is first folded into a very much flattened blank. I have found it preferable to so form this blank that the joint is brought very close to the opposite wall of the blank. The joint is then heated to a welding temperature, as is also the portion of the wall directly opposite and very close to the joint to be welded. After the joint has thus been heated to a welding temperature the blank is removed from the furnace or heating device and suitable pressure is applied to the edges of the joint, whereby the seam is welded. In this way a tube is formed having a cross-section whose dimension in one direction is very much less than its dimension at right angles thereto. It is found that this flattened blank can be opened and formed into a circular cross-section when cold, and by heating can be formed into any cross-section desired. The strip of metal opposite the joint and which is very close to the joint about to be welded being at a high temperature (approximately welding heat) serves to radiate sufficient heat to the inner side of the joint to maintain it at a high temperature until the welding can be accomplished.

I have found it desirable to make my improved process continuous so far as the formation of a single tube is concerned. This is accomplished by providing means for carrying the flattened tube continuously through a suitable furnace, whereby the joint and the opposite strip of metal are brought to the proper temperature just as they emerge from the furnace. Suitable welding mechanism is provided very close to the mouth of the furnace whereby the joint may be subjected to suitable pressure immediately upon leaving the mouth of the furnace, whereupon the welding may be accomplished before the metal has an opportunity to cool appreciably.

By means of my process I am enabled to form tubing of very thin sheet metal and of very much larger diameter than has heretofore been possible, and it is possible also by means of my invention to very much improve the character and strength of the welded sheet metal.

My invention will be more clearly understood by reference to the accompanying drawings, in which—

Figures 1, 2, 3, 4, 5, and 6 illustrate various steps in my improved process of forming a welded tube. Fig. 7 shows a furnace in longitudinal vertical section and hammering apparatus associated therewith, and Fig. 8 is a sectional view taken on line 8 8 of Fig. 7.

In Fig. 1 I have shown the sheet-metal blank whose edges 11 and 12 are to form the joint and which may or may not be scarfed, as found desirable. In carrying out my process this sheet is folded into a blank, as represented in Figs. 2 and 3, Fig. 2 showing the folded blank having scarfed edges and Fig. 3 showing a blank in which the edges have not been scarfed. After being folded into the form shown the folded blank is placed in a furnace such that the lapped joint itself will be heated to a welding temperature and so, also, that the portion of the wall of the blank directly opposite the lapped joint will also be heated to a high temperature. The heated portions are indicated in Figs. 2 and 3.

The apparatus for carrying out this process is shown in Figs. 7 and 8. The furnace in which the bent material is heated is divided into an upper and a lower portion, the lower portion consisting of the metallic inclosing side walls 13, front wall 14, rear wall 15, and the base 16, while the upper part consists of the metallic inclosing side wall 13', front wall 14', rear wall 15', and the roof-wall 16', this entire upper part being suitably supported from the framework 17. Both upper and lower portions are provided with a fire-resisting lining 18, to form the lower and upper combustion-chambers 19 and 19', respectively. Through the rear walls and into the combustion-chambers extend the burners 20 and 20'. Through the space 21 between the upper and lower parts of the furnace passes the folded blank 22 and forms the upper wall for the lower fuel-chamber and the lower wall for the upper fuel-chamber, the lapped edges 11 and 12 being disposed in the center of the furnace, and to confine the heat to the lapped edges and to the section 23 of the opposite wall the lower sides of the furnace parts are ledged inwardly. To retain the edges in proper alinement, and also to prevent buckling of the blank upon being heated, plates 24 may be provided at the interior thereof, and clamps 25 may engage over the outer edges of the blank, as shown in Fig. 8, the entire structure being then securely held in proper position and may be drawn through the furnace forwardly by hand or by machinery.

Directly before the outlet 26 of the furnace is placed the anvil 27, and a hammer 28 is pivoted to the shaft 29, supported in the bearing-standard 29'. Mounted in the bearing-standard 30 is the shaft 30', to which are secured the cam-wheel 31 and the driving-wheel 31', engaged by the belt b. Upon rotation of the driving-wheel the cam-wheel 31 engages the projection p from the shaft 29, and thus causes oscillation of the hammer. Directly below the hammer is disposed the anvil 27, the blank to be welded being drawn over the anvil, with the lapped edges below the hammer. Upon emerging from the furnace the blank passes over the fixed anvil-plate 32, whose end extends over the anvil, and thus prevents welding together of the blank walls. The radiation of the heat from the section 23 opposite the lapped edges assists in maintaining the high degree of temperature of the joint until the lapped edges are struck by the hammer to be welded together. As the engagement of the end of the anvil-plate 32 with the lapped edges and the section 23 is only for an instant, no heat is abstracted thereby, and at the same time the edges and the section 23 are prevented from being welded together. After the seam has thus been closed the folded blank may be expanded into the form of a circular tube, as shown in Fig. 4, this expansion being accomplished without heating the metal.

If other cross-sections are desired—such, for instance, as those having sharp corners—the entire blank may be heated to a comparatively low temperature, when it may be formed into a tube of any desired cross-section.

In Fig. 5 I have shown a folded blank in which the lapped joint is brought near one edge. The process of welding such a blank is of course similar to that already described in connection with the folded blanks shown in Figs. 2 and 3.

In Fig. 6 I have illustrated a folded blank consisting of two portions numbered 13 and 14, respectively. The edges of these portions are overlapped, as shown, whereupon they may be heated and welded, as already described in connection with the blanks shown in Figs. 2 and 3. In this modification the heat radiating from each of the joints assists in maintaining the necessary high temperature of the other joint. The form of folded blank shown in Fig. 6 may be used with advantage on extremely large pipe, in which it is difficult to procure single sheets of sufficient width to form the entire tube.

It will be seen that my improved process provides means whereby a welded pipe of very great diameter may be formed from exceedingly thin sheet metal. The tube formed in this manner is not buckled or warped or bent in any manner during the welding process, and for the reason that the welding temperature of the joint may be perfectly maintained until the welding operation has been accomplished the joint thus formed will be of very great strength and homogeneity.

It will of course be understood by those skilled in the art that a great variety of apparatus may be employed for carrying out my process, which indeed may be modified without departing from the spirit of my invention.

What I claim as new, and desire to secure by Letters Patent, is—

1. The process of forming a seamed tube, which consists in folding a suitable metal sheet into the form of a flattened blank in which the joint is brought close to the shell of the opposite side, heating the joint to a welding temperature and the portion of the shell opposite the joint to approximately the same temperature, and then welding the joint by the application of suitable pressure.

2. The process of forming a seamed tube, which consists in folding a suitable metal sheet into the form of a flattened blank in which the joint is brought close to the shell of the opposite side, heating the joint to a welding temperature and heating the portion of the shell opposite the joint, and then welding the joint by the application of suitable pressure.

In witness whereof I hereunto subscribe my name this 16th day of February, A. D. 1904.

JAMES HALL TAYLOR.

Witnesses:
 HARVEY L. HANSON,
 CHARLES J. SCHMIDT.